(12) United States Patent
Maldener et al.

(10) Patent No.: US 6,300,704 B1
(45) Date of Patent: *Oct. 9, 2001

(54) ROTOR FOR AN ELECTRIC MOTOR AND PROCESS FOR MANUFACTURING THE ROTOR

(75) Inventors: Klaus Maldener, Lauf; Ralf Schmidt, Renchen; Martin Kiefer, Oberkirch; Hans-Joerg Fees, Bietigheim-Bissingen, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/463,355
(22) PCT Filed: Feb. 15, 1999
(86) PCT No.: PCT/DE99/00412
 § 371 Date: Jan. 27, 2000
 § 102(e) Date: Jan. 27, 2000
(87) PCT Pub. No.: WO99/62166
 PCT Pub. Date: Dec. 2, 1999

(30) Foreign Application Priority Data

May 28, 1998 (DE) .............................................. 198 23 851
Jun. 17, 1998 (DE) .............................................. 198 26 886

(51) Int. Cl.$^7$ ..................................................... H02K 1/22
(52) U.S. Cl. ............................. 310/261; 310/233; 29/598
(58) Field of Search ................................... 310/261, 233, 310/234, 231; 29/597, 598, 596, 733

(56) References Cited

U.S. PATENT DOCUMENTS

| | | | |
|---|---|---|---|
| 3,639,789 | * 2/1972 | Bednarski | ............................. 310/43 |
| 3,659,130 | * 4/1972 | Lilley et al. | ........................ 310/234 |
| 3,668,449 | * 6/1972 | King | ..................................... 310/236 |
| 3,713,208 | * 1/1973 | Doyle | ..................................... 29/597 |
| 3,924,148 | * 12/1975 | Tachibana et al. | .................. 310/220 |
| 3,942,246 | * 3/1976 | Wilding | ................................. 29/597 |
| 3,973,738 | * 8/1976 | Miller | .............................. 242/433.3 |
| 4,039,876 | * 8/1977 | Takasaka | ............................. 310/266 |
| 5,044,065 | * 9/1991 | Dyke et al. | ............................. 29/597 |
| 5,352,948 | * 10/1994 | Kirn et al. | ........................... 310/214 |
| 5,400,495 | * 3/1995 | Murai | ................................... 29/597 |
| 5,470,615 | * 11/1995 | Sbalchiero et al. | .................. 427/459 |

FOREIGN PATENT DOCUMENTS

| | | |
|---|---|---|
| 1763508 | * 12/1971 | (DE) . |
| 2620917 | * 12/1977 | (DE) . |
| 2351527 | * 5/1977 | (FR) . |
| 1045384 | * 10/1966 | (GB) . |
| 1136086 | * 12/1968 | (GB) . |
| 2 052 170 A | * 1/1981 | (GB) . |
| 2250384 | * 3/1992 | (GB) . |
| 61236347A | * 10/1986 | (JP) . |
| 90/04864 | * 10/1988 | (WO) . |

* cited by examiner

*Primary Examiner*—Joseph Waks
(74) *Attorney, Agent, or Firm*—Ronald E. Greigg; Edwin E. Greigg

(57) ABSTRACT

A rotor for an electric motor includes a commutator and a rotor shaft with a rotor winding that is contained in a rotor body supported on the rotor shaft in a rotationally fixed manner. The commutator has commutator lamellas that are disposed axially next to one another in the circumference direction with an insulation gap and have connection lugs for attachment of connecting wires of the rotor winding. In a region between the commutator and the rotor body, an additional winding is wound around the connecting wires in order to fix or stabilize the connecting wires. The rotor is provided for electric motors used in vehicle construction.

9 Claims, 1 Drawing Sheet

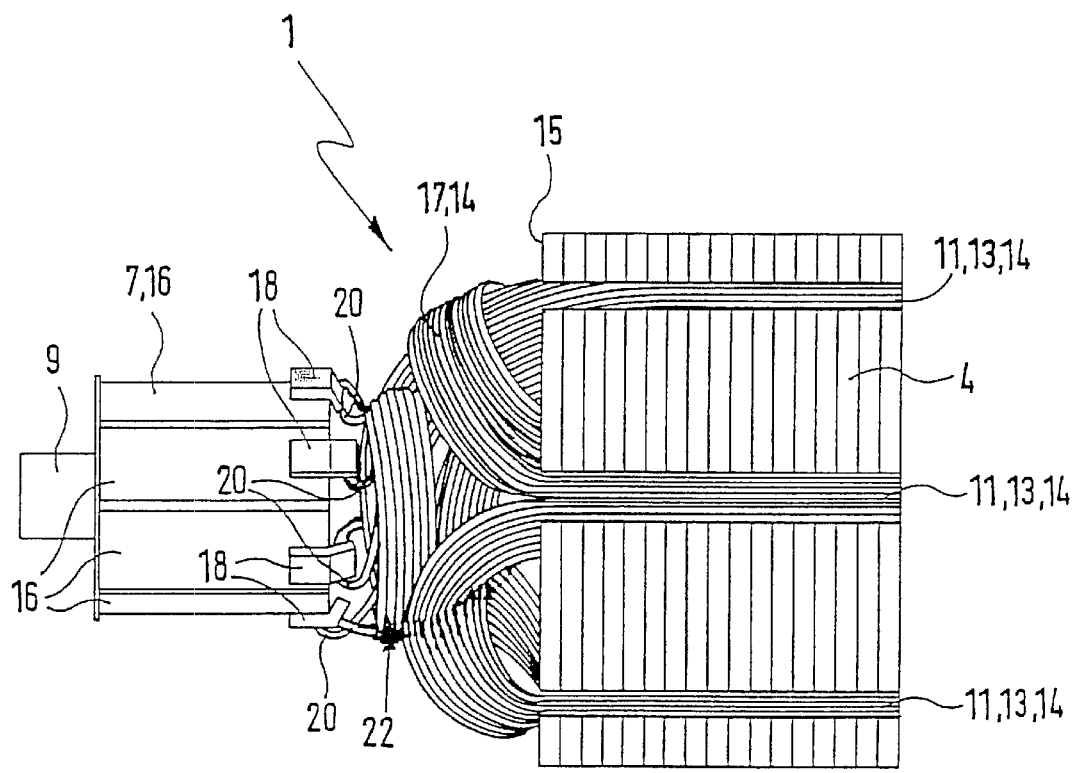

ROTOR FOR AN ELECTRIC MOTOR AND PROCESS FOR MANUFACTURING THE ROTOR

PRIOR ART

The invention is based on a rotor for an electric motor and on a process for manufacturing the rotor.

In rotors for commutator or collector machines, the individual, insulated winding wires of the rotor- or armature winding are inserted into axial grooves distributed over the circumference of the rotor body, which is embodied as a laminated stack of sheets, wherein the end faces of the winding wires, which are wound into separate winding coils, protrude as so-called winding heads from the two end faces of the rotor body. The individual connecting wires to the winding coils are conveyed to connection lugs embodied on the individual commutator lamellas using different winding techniques and, by winding the wires the connection lugs around and bending the connection lugs over, are attached and electrically connected to the lugs, for example by means of ultrasonic welding. An exemplary embodiment for a so-called hook commutator and for the embodiment of the so-called hooking technique when fixing the winding connection wires onto the commutator hooks is described in WO 90/04864.

So that no vibrational fractures can be produced in the rotor winding during operation and in particular during the usually required high-stress vibration testing of the rotor, additional measures are required for fixing or stabilizing the connecting wires in the region between the connection lugs and the rotor body. The individual connecting wires of the winding coils which lead to the connection lugs of the individual commutator lamellas will be referred to below as switching wires. As an additional measure for fixing or stabilizing the switching wires, DE 26 20 917 A1 has disclosed placing a number of absorbent strings or belts over the entire circumference around the free winding ends. However, for technical manufacturing reasons an embodiment of this sort is expensive, incurring considerable costs, particularly in a mass production of the rotor.

ADVANTAGES OF THE INVENTION

The rotor according to the invention and the process according to the invention for manufacturing the rotor, has an advantage over the prior art that standard processes for rotor winding already in use can be employed without requiring special adaptations or additional parts in order to increase the stability of the switching wires so that during operation, in particular during vibrational testing, vibrational fractures can no longer occur. It is particularly advantageous that the rotor according to the invention is suitable for high rotational speeds.

Advantageous improvements and updates of the rotor disclosed and the process disclosed are possible by means of the measures taken herein after.

BRIEF DESCRIPTION OF THE DRAWINGS

The drawing illustrates a partial perspective end view of an exemplary embodiment of the invention is a and will be explained in detail in the description.

DESCRIPTION OF THE EXEMPLARY EMBODIMENT

The armature or rotor 1 that is for an electric motor and is depicted in a perspective view in the sole FIGURE has a rotor body 4 embodied as a laminated stack of insulated metal sheets and a metal collector or commutator 7. The rotor body 4 and the commutator 7 are both accommodated in a rotationally fixed manner on a common rotor shaft 9. The rotor body 4 has axial grooves 11 distributed over the circumference into which an armature- or rotor winding 13 is wound. The individual, insulated rotor winding wires 14 of the rotor winding 13 are thus inserted into the axial grooves 11 in a number of layers in a well know order and constitute individual winding coils which are connected by way of connection lugs 18 in an electrically conductive manner to the individual commutator lamellas 16 of the commutator 7. The commutator lamellas 16 are disposed in the conventional fashion on the circumference of an insulating body, which is not shown in detail in the drawing and is supported on the rotor shaft 9 in a rotationally fixed manner, next to one another with an insulating gap disposed between them and extend over the entire axial length of the body.

In order to electrically connect the rotor winding 13 to the commutator 7, the individual commutator lamellas 16 are provided with the connection lugs 18, which are preferably embodied of one piece and are also called commutator hooks. On the end face of the commutator lamellas 16 oriented toward the rotor body 4, the connection lugs 18 are bent over away from this rotor body and toward the commutator lamellas 16 so that the individual connection lugs 18 enclose a small, acute angle with their commutator lamellas 16. Connecting wires of the rotor winding 13, so-called switch conductors 20, which lead from the individual winding coils of the rotor winding 13 to the connection lugs 18, are conveyed to the connection lugs 18 using different hooking techniques. In so doing, the winding coils that are formed into coil packets protrude with so-called winding heads 17 slightly beyond an end face 15 of the rotor body 4 oriented toward the commutator 7. One hooking technique, for example, is the hook-around technique in which each switching wire 20, starting from the axial groove 11 of the rotor body 4 is not conveyed to the connection lug 18 disposed opposite a winding coil center of the respective winding coil, but is conveyed to a connection lug 18 that is offset in the circumference direction by a particular angular distance which is less than 360 degrees. However, it is also possible to use the side-hook winding technique (direct connection) in which the one switching wire 20, starting from the axial groove 11 of the rotor body 4 is always conveyed to the connection lug 18 disposed opposite the winding coil center, without there being an angular distance in the circumference direction. In order to contact and fasten the switching wires 20 to the connection lugs 18, these wires are wound once or several times around the connection lugs 18 and are mechanically and electrically attached to the connection lugs 18 using a known contacting process, for example by means of ultrasound welding. The rotor winding 13 with the rotor winding wires 14 can be produced by winding the rotor body 4 with the aid of a single wire. However, it is also possible to produce the rotor winding 13 by means of a joint winding of two wires as a so-called H winding so that two switching wire ends 20, for example, are conveyed to the remaining connection lugs 18 and are attached to them.

The switching wires 20, which extend in the region between the rotor body 4 with its winding heads 17 and the connection lugs 18, must be fixed in their position so that no vibrational fractures in the rotor winding 13 occur during operation and in particular during the high-stress vibrational testing required for electric motors used in the vehicle construction. Furthermore, this fixing is intended to counteract the centrifugal forces which occur at high speeds of the rotor 1. In order to fix these switching wires 20, according to the invention, before the final hooking of a still remaining, not yet contacted connection lug 18, the switching wire 20 for this connection lug 18 is conveyed, in the region between the commutator 7 and the winding head 17 that protrudes slightly beyond the rotor body 4, at least once around the switching wires that have already been conveyed to the connection lugs 18, and only after this is the last remaining connection lug 18 hooked. This additional winding 22 of the switching wires 20 is provided at least once around the rotor shaft 9 so that this additional wire loop extends at least 360° in the circumference direction around the rotor shaft 9, resting against the switching wires 20. Preferably, this additional winding 22 of the switching wires 20 is executed several times around the rotor shaft 9, e.g. three to five times.

The additional winding of the switching wires 20 can be used for both single winding and double winding. The rotor winding wires 14 have an insulating layer in a known manner. In addition, this insulating layer can also be covered by a so-called baking lacquer, which causes the individual wires 14, 20, 22 to bake together as a result of heating caused by the flow of current in the wires 14, 20, 22. The supply of current to the wires 14, 20, 22 is provided after the additional winding 22 of the switching wires 20 so that the baking produces an additional stiffening of the switching wires 20 by means of the baking lacquer. The baking is an irreversible hardening process of the baking lacquer, which leads to a fixed connection of the wires 14, 20, 22, which remains stable even with a subsequent heating. The additional winding of the switching wires 20 according to the invention is preferably used in commutators 7 that have hook-around winding of the connection lugs 18. However, it is also conceivable for there to be a combination of the additional winding of the switching wires 20 according to the invention with the so-called side-hook winding technique of the connection lugs (direct connection). It is particularly advantageous that existing winding machines and baking apparatuses can be used with slight changes, without additional parts being required.

It is also conceivable to carry out this additional winding 22 only after the hooking of all of the connection lugs 18 so that the wire provided for this purpose, in the case of a single winding, has a free wire end not attached to a connection lug 18. In the case of a double winding, two free wire ends are correspondingly produced. The baking of the switching wires 20 can be produced by means of externally supplying heat to the rotor 1, at least in the vicinity of the additional winding 22.

The foregoing relates to a preferred exemplary embodiments of the invention, it being understood that other variants and embodiments thereof are possible within the spirit and scope of the invention, the latter being defined by the appended claims.

What is claimed is:

1. A rotor for an electric motor, comprising a rotor shaft, a rotor winding (13) on said rotor shaft, said rotor winding including winding wires (14), connecting wires (20) and at least one additional wire (22) each of which are surrounded by a lacquer which is cured by baking and contained in a rotor body (4) supported on the rotor shaft in a rotationally fixed manner, a commutator that has axially aligned commutator lamellas that are disposed spaced parallel to one another in a circumferential direction with an insulation gap therebetween and have connection lugs secured to one end of each of the lamellas for the attachment of said connecting wires (20) of the rotor winding, said at least one additional wire (22) being wound around the connecting wires (20) and forming an additional winding, in a region between the commutator (7) and the rotor body (4), and at least in a region of the additional winding (22) the rotor winding is heated so that the lacquer which is cured by baking is baked on said additional winding.

2. The rotor according to claim 1, in which rotor winding wires (14) of rotor winding (13) constitute the additional winding (22).

3. The rotor according to claim 2, in which the additional winding (22) is wound a number of times around the connecting wires.

4. The rotor according to claim 3, in which the additional winding (22) is wound three to five times around the connecting wires.

5. The rotor according to claim 1, in which the additional winding (22) is wound a number of times around the connecting wires.

6. The rotor according to claim 5, in which the additional winding (22) is wound three to five times around the connecting wires.

7. The rotor according to claim 1, in which the additional winding (22) is carried out before a hooking of a last remaining connection lug (18) of the commutator (7).

8. The rotor according to claim 1, in which electrical current is conveyed through the wires (14, 20, 22) in order to heat at least a region of the additional winding (22).

9. The rotor according to claim 1, in which heat is externally supplied to the rotor (1) in order to heat at least the region of the additional winding (22).

* * * * *